United States Patent

[11] 3,558,015

| [72] | Inventor | Robert D. Hardesty<br>Route 1, Spangle, Wash. 99031 |
|---|---|---|
| [21] | Appl. No. | 836,446 |
| [22] | Filed | June 25, 1969 |
| [45] | Patented | Jan. 26, 1971 |

[54] HIGH FLOTATION MATERIALS DELIVERY TRACTOR
10 Claims, 7 Drawing Figs.

[52] U.S. Cl. .................................................. 222/136,
214/83.32, 214/518, 222/178, 222/331, 259/41
[51] Int. Cl. ...................................................... B60p 1/56
[50] Field of Search .......................................... 214/83.32,
83.36, 519; 259/41; 222/331, 139, 178, 136

[56] References Cited
UNITED STATES PATENTS

| 2,960,320 | 11/1960 | Heider .......................... | (214/83.32) |
| 3,265,227 | 8/1966 | Vratil et al. .................... | 214/83.32 |

*Primary Examiner*—Albert J. Makay
*Attorney*—Norman H. Huff

ABSTRACT: A high flotation materials delivery vehicle and tractor adapted to pull plural agricultural implements and having a compartmented tank effective to discharge both liquid and/or dry chemicals independently or in mixtures and in selected quantities, the operator being so placed as to conveniently operate the tractor, observe the towed implements and the chemical discharge.

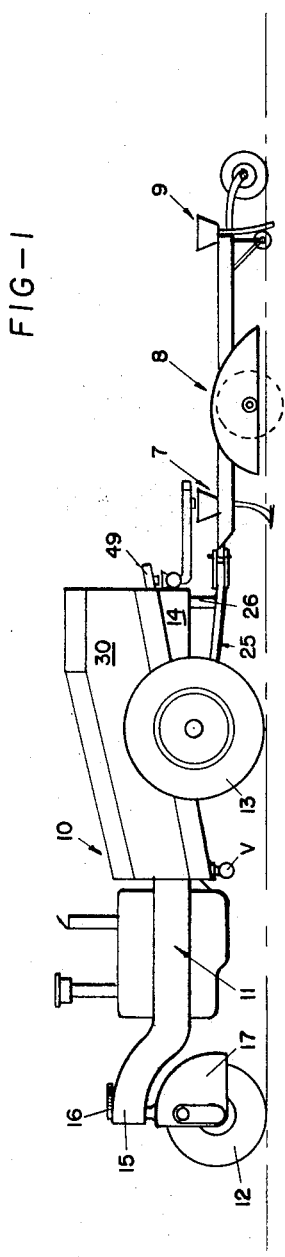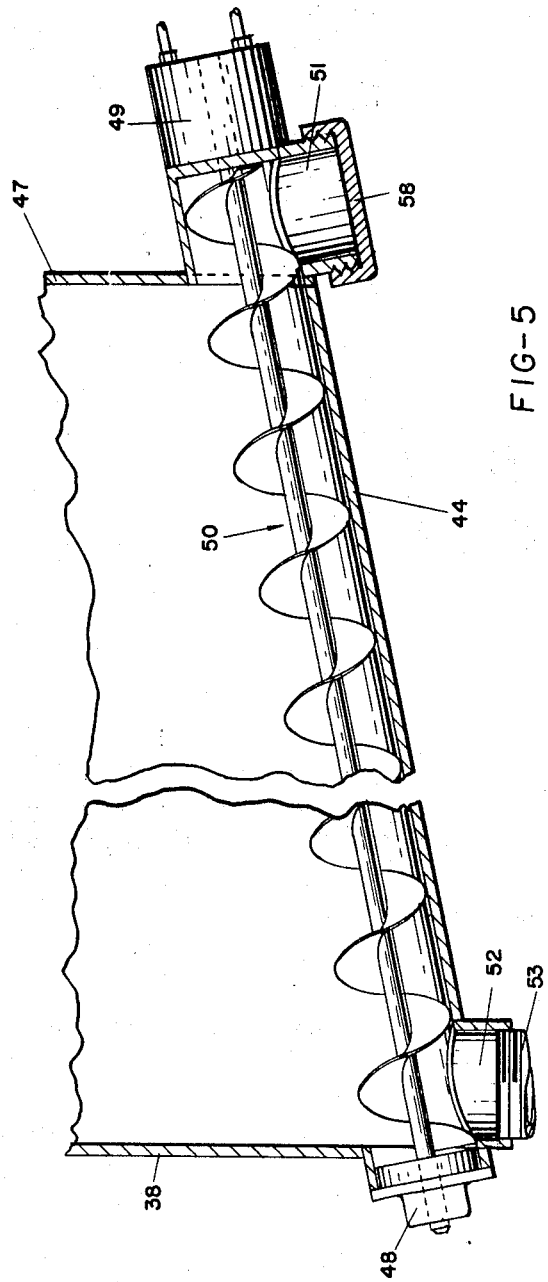

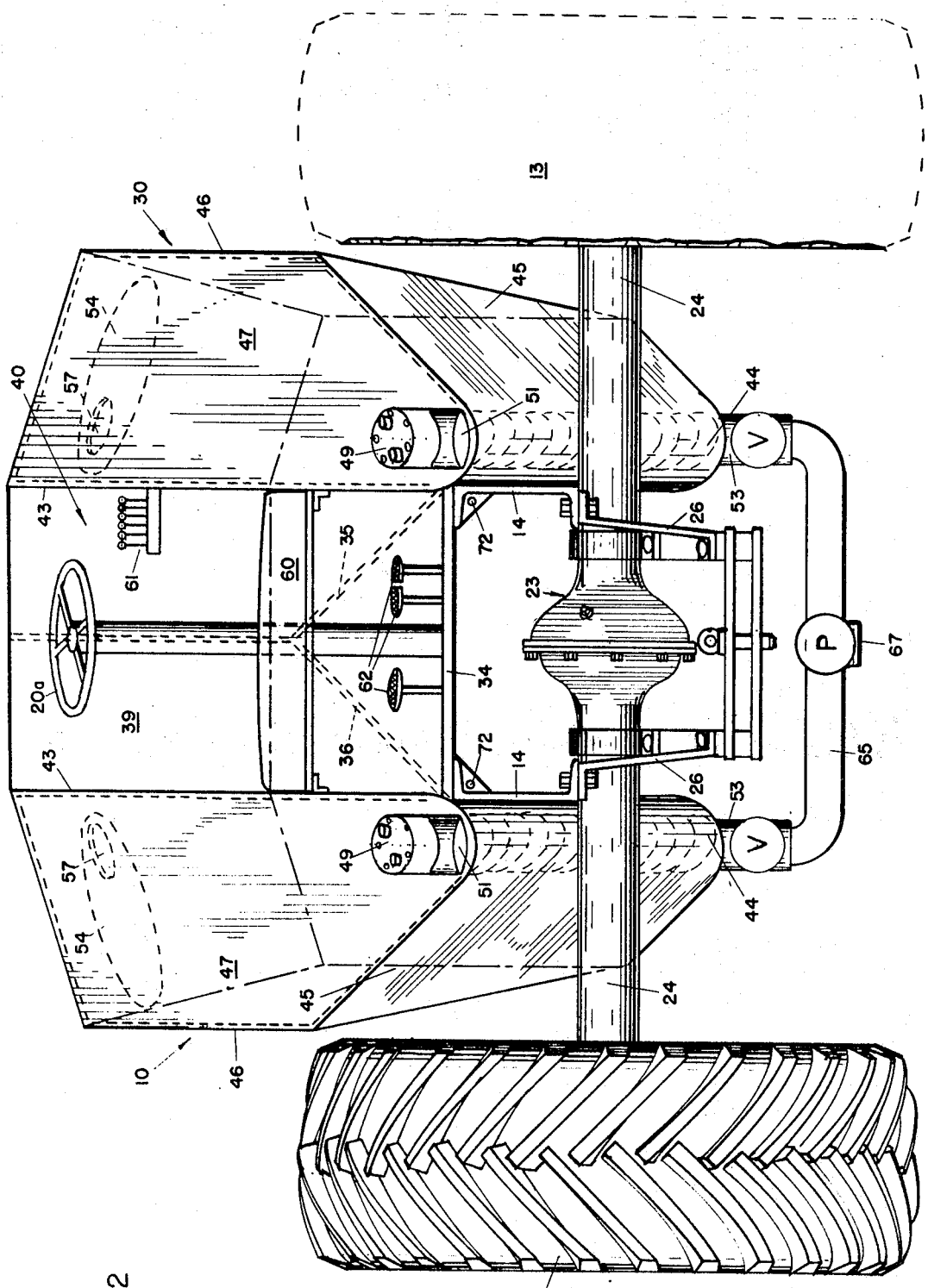

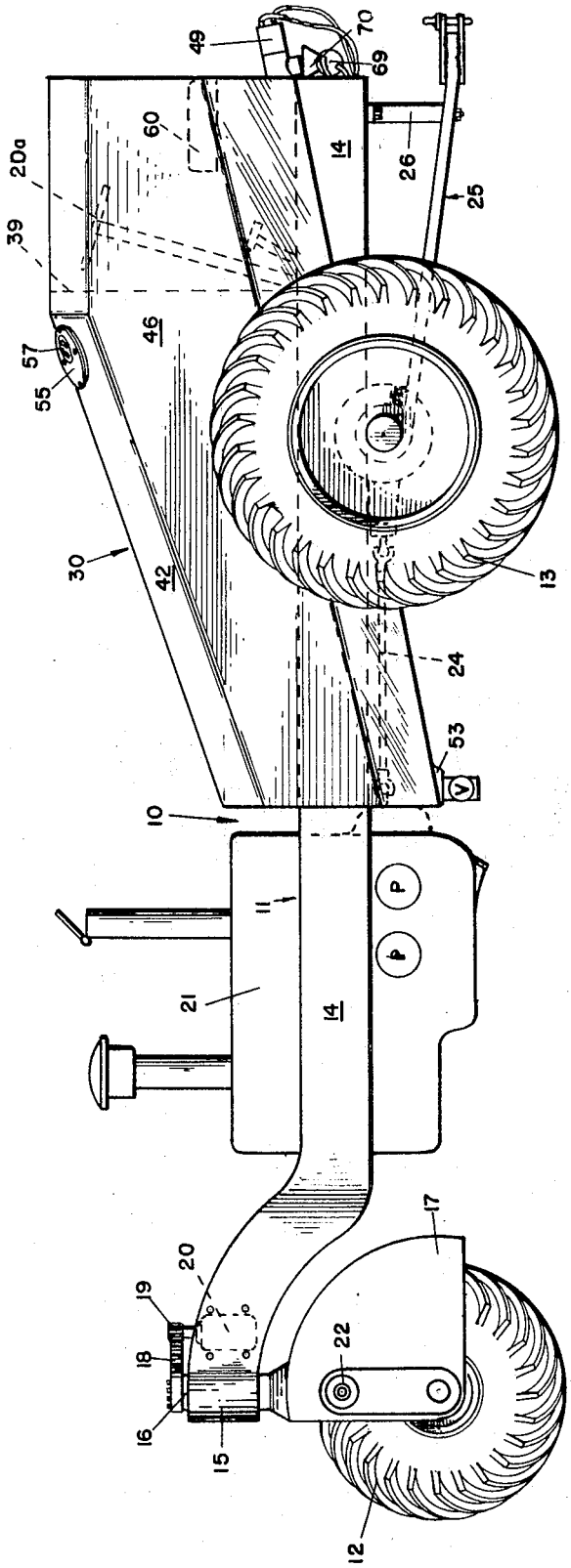
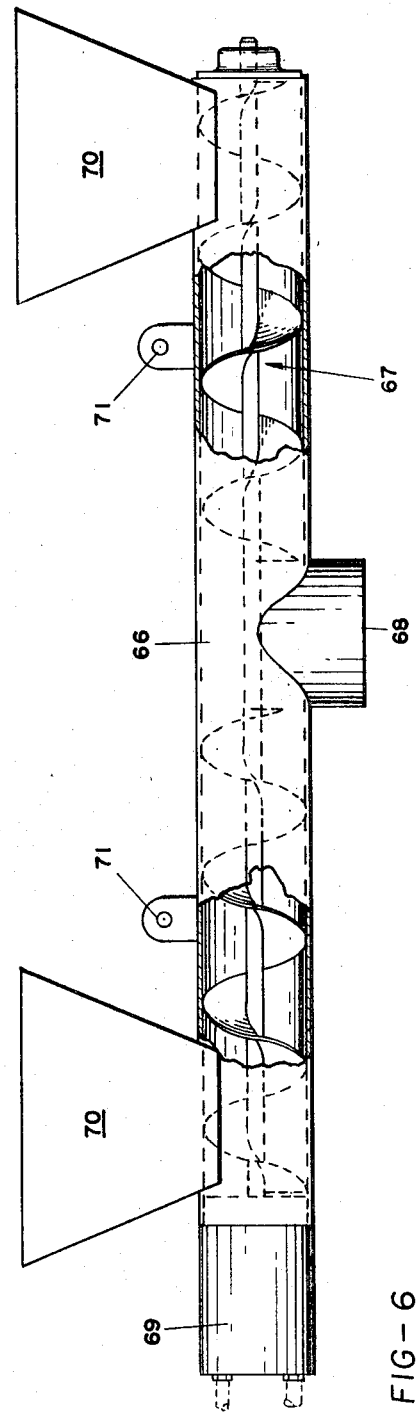

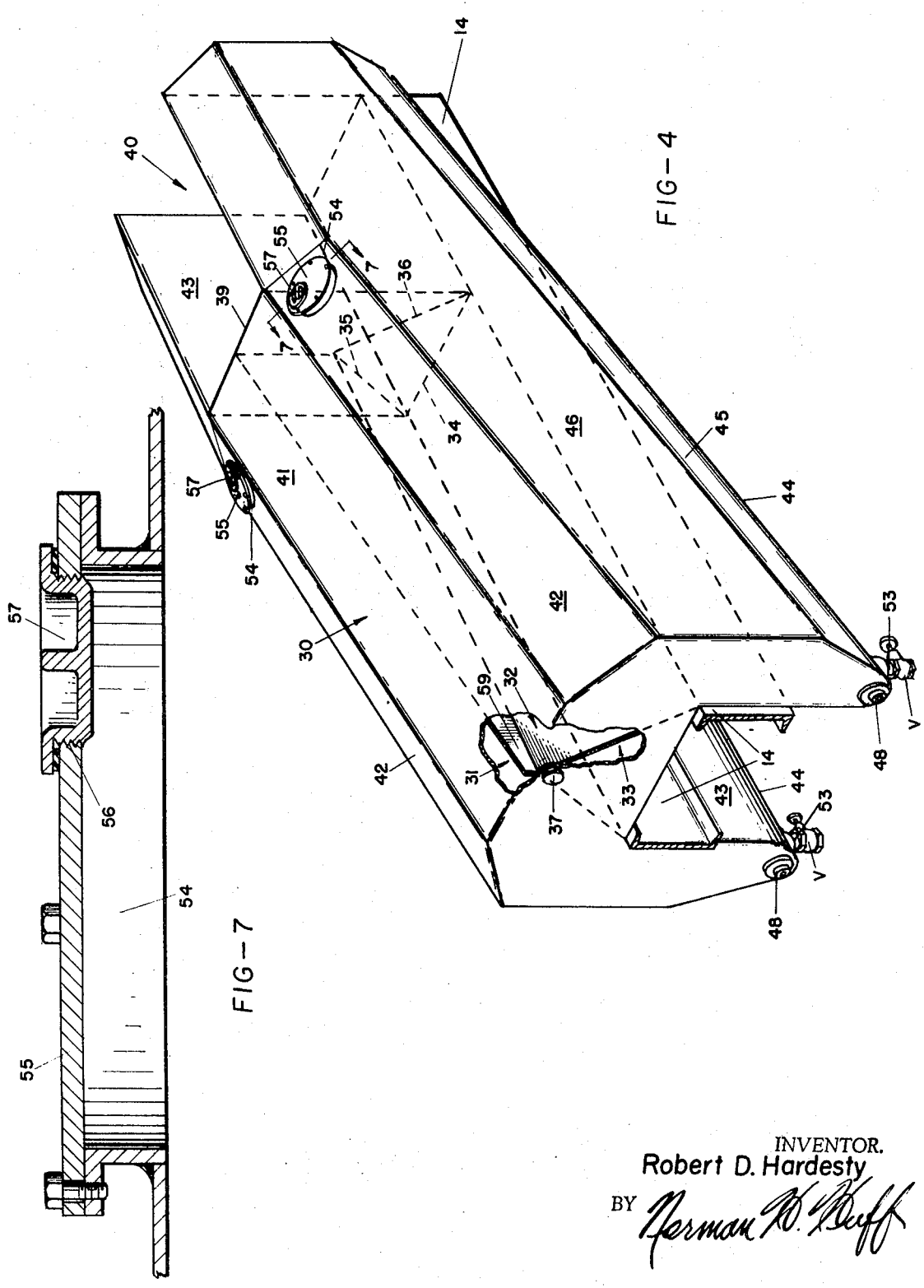

HIGH FLOTATION MATERIALS DELIVERY TRACTOR

This invention relates to the field of agricultural implements and more particularly to an implement drawing tractor which also may serve to transport and apply liquid and/or dry fertilizer, herbicides and the like.

A principal object of my present invention is to provide a multipurpose tractor with which the operator may perform simultaneously many of the agricultural duties now requiring successive efforts.

It is common practice to combine certain analogous activities in soil tillage. For example, one frequently sees the discing and harrowing functions performed simultaneously with a single tractor. Also, it is conceivable that pesticides, herbicides and fertilizers can be simultaneously applied, but not always can one find the ideal chemicals in a form compatible with others. While the liquid herbicides and pesticides may be found to perform their functions rapidly, it is frequently desired to utilize a powdered or prilled fertilizer to release its nutrients over a longer period of time. Heretofore, it has been necessary to apply differing forms of applications at different times.

My present invention provides a tractor which may draw a number of implements and at the same time apply the aforesaid chemicals in both liquid and dry conditions and mix conflicting or reacting chemicals at the moment of application.

To this end, I found it desirable to employ a tank shape specifically designed to place the operator in an optimum position for monitoring the function of each implement as well as the track or steering of the tractor to eliminate "spotting" or skipped areas in the field.

It is thus evident that a further object of my present invention lies in the provision of a compartmented tank arrangement the shape of which facilitates its use for either a liquid or a dry chemical or both.

Yet another object is to provide a compartmented tank arrangement upon a high-flotation wheeled chassis with the tank compartments constructed to facilitate gravity flow of both liquid and dry chemicals combined with an outer configuration adapted to promote good visibility for and optimum placement of the operator.

It is yet another object to provide a unique high-flotation materials delivery tractor with versatile discharge means selectively changeable to admit of utilizing the same compartmented tank for chemicals having different characteristics, for example, liquid and dry.

The foregoing and other objects and advantages of the present invention will become more apparent and meaningful during the course of the following specification when considered in association with the accompanying drawings wherein a preferred form of the invention is graphically illustrated. It is to be understood however, that the drawings are illustrative only and are not intended to limit the scope of the invention. It should also be understood that various changes in construction may be resorted to in the course of manufacture without in any way departing from the spirit of the invention which is to be understood only in accordance with the appended claims. Furthermore, it is to be understood that while the invention is described in one particular association, it is not my intention to unnecessarily limit the applicability of the invention, but I desire to reserve to myself the claimed invention for every use of which it is now known or subsequently discovered to be susceptible.

A preferred embodiment of the invention is graphically exemplified in the accompanying drawings wherein like reference numerals are employed to designate like parts throughout the several views in which:

FIG. 1 is a line drawing side elevation showing a tractor according to the present invention, hitched to a plurality of agricultural implements;

FIG. 2 is an enlarged rear elevation of the tractor;

FIG. 3 is a side elevation thereof reduced from the scale of FIG. 2;

FIG. 4 is a perspective view of the compartmented tank supported upon a fragment of the tractor's chassis;

FIG. 5 is a longitudinal vertical elevation through one compartment of the tank and having parts broken away for convenience of illustration;

FIG. 6 is a rear view partially in elevation and partially in section of a mixing attachment for the rear of the tank; and FIG. 7 is a fragmentary section through a manhole opening, cover and filler of one tank compartment.

Referring now more in detail to the drawings, the reference numeral 10 indicates in its entirety my improved tractor which includes a chassis 11 supported upon ground engaging front and rear wheels 13 and 13. The chassis 11 has a pair of laterally spaced longerons 14-14, which in the case of a single high-flotation front wheel 12, as shown, terminate forwardly in a bearing sleeve 15 which rotatably receives a kingpin 16 carried by the wheel supporting fender 17. A gear section 18 is fixed to the kingpin 16 and a pinion 19 meshes therewith. A reversible fluid motor 20 controlled by manual manipulation of the steering wheel 21 through the medium of fluid under pressure from one of the fluid pumps P through conventional conduit and valves serves to steer the tractor, by rotating the pinion in response to the steering movements of the steering wheel 20a. Of course, if desired, the front of the tractor may be provided with two spaced-apart wheels and steered in the conventional manner.

An internal combustion engine 21 is carried by the chassis 11 between and upon the longerons 14 to provide power to mobilize the tractor as well as to drive the two fluid pumps P-P. By valved fluid conduit, the pressurized fluid may energize a reversible fluid motor, as 22 of the front wheel 12, adapted to drive said wheel according to manual selection. In like manner, the rear wheels 13 may be driven. Or, as shown, a conventional rear transmission 23 including the axle housing 24 may be employed in which case, it is seen in FIG. 2, that the longerons 14-14 extend over and are supported upon the axle housing. A drive line 24 connects the engine 21 to the rear transmission through a clutch and gear box, all of which is common and well-known in the art.

A draw bar 25 has its forward end fixed to the axle housing 24 and is supported by braces 26-26 carried by the longerons 14.

To the draw bar 25 I have shown, connected in series, a dry fertilizer spreader 7, a rotary tiller 8 and a seeder 9, to illustrate the tractor's capacity to accomplish plural agricultural operations during a single pass. Obviously, other implements may be added or substituted as the need may dictate.

Having reference now more particularly to FIG. 4 of the drawings, it will be seen that I have contrived a uniquely shaped tank 30 having two main compartments 31 and 32 and a third compartment 33. The compartments 31 and 32 are allochiral and the description of one will serve to disclose the other. The third compartment is triangular in vertical section, laterally of the tractor 10, wherein its base wall 34 is disposed in a horizontal plane resting upon the tops of the longerons 14-14, and extending from one outer side to the other thereof. The two angular walls 35 and 36 are disposed with the triangular apex upwardly and form a portion of the inner walls of the compartments 31 and 32 as clearly seen. A filler hole and cap 37 is formed through the tank front end vertical wall 38 and communicates with the compartment 33. This compartment is closed at its rearward end by a vertical wall 39 which rests upon the base wall 34, abuts the ends of the angle walls 35 and 36 and constitutes the front wall of the operator's compartment 40, the floor of which may be a rearward extension of the wall 34 or another stronger sheet.

It will be noted that the top wall 41 of the tank and its chamfered marginal edge portions 42-42 are angled downwardly from the plane of the wall 39 to the front wall 38 forwardly of the tractor. This provides for visibility for the operator located in the compartment 40 so that he can see the ground near the tractor on the sides and the front wheel assembly 12 to facilitate ground control visibility. Conventionally, in vehicles of this class, the operator is placed forwardly of the tank; but then he cannot observe the implements drawn behind. I prefer to locate the operator in the compartment 40, rearwardly of the wall 39 and between the spaced apart compartments 31 and 32.

To this end, spaced vertical walls 43-43 are hermetically secured to the lateral vertical edges of wall 39 and extend downwardly at the outer sides of the longerons 14-14. The side walls 43 also extend forwardly to the front wall 38 with their upper edges hermetically attached to the lateral edges of the base wall 34 from wall 39 forwardly. At their lower edges, side walls 43 are angled downwardly from the rear of the tank 30 to the front wall 38 and are laterally bent into a segment of a cylinder as seen at 44-44 and thence continue upwardly at an outward incline at 45-45 at such an angle that dry powdered or prilled chemicals will flow by gravity into the angled trough or cylindrical segments 44-44. Thence, the outer side walls 46-46 extend vertically to meet and hermetically attach to the top portions 42.

Vertical rear end walls 47-47 close the rear of the tank compartments. If desired, the tank's outer sidewalls 46-46 may converge toward the front to facilitate the aforesaid visibility.

In each angularly disposed trough or cylindrical segment I mount, by bearing 48 and fluid motor 49, a rotary spiral conveyor 50 adapted to elevate and discharge dry materials through its respective discharge opening 51.

At its forward, lowermost end, I provide a cavity 52 communicating with a discharge opening 53. A valve V is provided to control flow from each discharge opening 53. Caps 58 serve as shutoff valves for the discharge openings 51 when a liquid is handled and the speed of rotation or stopping of the auger 50 serves as a flow control and shutoff when a dry material is handled.

At or near the uppermost point of the tank compartments 31 and 32 I provide manholes 54-54 having openings large enough to admit a man for cleaning purposes and having closures 55-55 which contain filler holes 56-56 with bungs 57-57.

In the operators compartment 40 I provide a seat 60 and the necessary vehicle and fluid controls as indicated by a bank of levers 61 and foot pedals 62. It will be understood that conventional fluid conduit and linkages will complete the selective operations in manners common and well known.

Complimentary discharge openings 53-53 and 51-51 may be interconnected by conduits 65 and 66 so that the contents of compartments 31 and 32 may be mixed or combined in ratios dictated by the relative openings in the valves V-V in the first instance and the relative speeds of rotation of the augers 50 in the latter.

Each conduit 65 and 66 has a control exhaust opening 67 and 68 to exhaust the combined materials. Since the openings 53-53 are used to discharge liquids from the tanks, a pump P or more if desired, may be included in the conduit 65 to facilitate elevating or pressurizing the discharge.

Conduit 66 has an allochiral auger 67 rotated by fluid motor 69 to bring the dry materials received from the discharge openings 51 through hoppers 70-70 to the central exhaust opening 68.

The conduit 66 is detachably mounted by threading conventional bolts (not shown) through eyes 71-71 and into fillets 72-72 (FIG. 2) which supports the hoppers with respect to openings 51-51.

I claim:

1. In a high-flotation material delivery tractor of the character described, having:
   a unitary chassis including a pair of spaced apart generally horizontal rearwardly extending longerons;
   wheels supporting said chassis;
   power means carried by said chassis and drivingly connected to selectively rotate the wheels for mobilizing said tractor;
   manually controllable means for steering said tractor; the improvement, comprising a compartmented material delivery tank carried by said chassis and having one compartment depending at each side of said chassis;
   each said compartment having means for introducing selected materials into each said compartment;
   a concavity to which material will tend to flow by gravity;
   an inclined bottom wall terminating at its lower end at said cavity;
   a materials conveyor adapted to elevate materials along said inclined wall; and
   valved discharge openings at said concavities and the upper ends of said inclined walls for simultaneously or independently dispensing materials from said compartments.

2. The invention according to claim 1 wherein:
   said tank has its compartments spaced apart at its rearward end to accommodate the tractor's operator therebetween; and
   forwardly thereof the upper surfaces are angled downwardly to increase the operators visibility of the ground area near the tractor.

3. The invention according to claim 2, wherein the said conveyors are independently driven rotary spiral conveyors.

4. The invention according to claim 3 and further characterized by means for receiving materials simultaneously from the coincident discharge openings of the two compartments and combining said materials before application.

5. The invention according to claim 4 wherein said last-named means comprises:
   plumbing connected to receive and mix materials from the gravity fed discharge openings including at least one pump adapted to discharge the mixture from a single exhaust openings; and
   an allochiral spiral conveyor adapted to receive from the openings at the upper ends of said inclined walls materials and convey the materials to a central exhaust opening therein where the combined materials are discharged.

6. The invention according to claim 4 wherein said last-named means comprises a cylinder having ends adapted one to receive materials from each said discharge openings and a center exhaust opening for discharging the combined materials.

7. The invention according to claim 6 wherein;
   said cylinder encloses a rotary spiral having allochiral pitches at opposed ends; and
   a motor for rotating said spiral to convey the materials received at each end to the center exhaust opening for discharge.

8. The invention according to claim 6 wherein said cylinder includes at least one pump to receive materials from said ends and discharge the combined materials through the said exhaust openings.

9. The invention according to claim 1 and further characterized by:
   a rear axle housing;
   said chassis being supported above the rear axle housing;
   said tank being mounted with said inclined walls extending upwardly rearwardly of the tractor over said rear axle housing and terminating forwardly at the said concavities disposed at a level lower than said rear axle housing; and
   the top surfaces of said tank being correspondingly inclined to increase forward visibility of the ground near the tractor.

10. The invention according to claim 1 wherein a laterally triangular third compartment has its base extending across said longerons and its apex directed upwardly and constituting a part of the inner walls of said laterally arranged compartments to facilitate said flow of materials by gravity.